United States Patent

Warren et al.

[11] 4,404,603
[45] Sep. 13, 1983

[54] APPARATUS AND METHOD FOR INSPECTING MAGNETIC TAPE RECORDED MATERIAL FOR ALTERATIONS

[76] Inventors: Eugene D. Warren, 12966 Caminito en Flor, Del Mar, Calif. 92014; Lawrence M. Martin, 968 Santa Estella, Solana Beach, Calif. 92075; Daniel L. Kinnaman, 4164 Terry St., Oceanside, Calif. 92054

[21] Appl. No.: 153,383

[22] Filed: May 27, 1980

[51] Int. Cl.³ ............................................. H04N 5/795
[52] U.S. Cl. .................................. 360/33.1; 324/212; 360/31
[58] Field of Search ................................... 360/33-38, 360/31, 25, 66; 358/127-132; 369/53-54, 58; 324/212

[56] References Cited

U.S. PATENT DOCUMENTS

| | | | |
|---|---|---|---|
| 3,182,135 | 5/1965 | Siezen | 369/58 |
| 3,404,223 | 10/1968 | Violette | 360/31 |
| 3,406,264 | 10/1968 | Phillipson et al. | 369/58 |
| 3,474,331 | 10/1969 | Chur | 324/212 |
| 3,755,731 | 8/1973 | Young | 324/212 |
| 3,883,892 | 5/1975 | Kneller et al. | 360/59 |
| 4,263,625 | 4/1981 | Warren | 360/31 |

*Primary Examiner*—Raymond F. Cardillo, Jr.

[57] ABSTRACT

A method and apparatus for automatic high speed inspection of information recorded on magnetic video tape to determine if the original recording has been altered by erasure or over-recording has been added to in a previously unrecorded portion of the tape. To facilitate the inspection, a low frequency signal is added to the audio track of the tape at the time the original recording is made. Inspection consists of sensing the tape's video control track and the audio track containing the added low frequency signal while rewinding the tape at high speed. During rewind, sensing means positioned on the backside or non-oxide coated surface of the tape receives signals from both the video control track and audio track. The detected signals are processed by an error detection circuit where they are analyzed to determine the tape speed, control track pulse amplitude, audio signal amplitude, control track pulse pattern, and low frequency audio signal pattern. A tape without alterations is indicated by the simultaneous presence of both the added low frequency audio track signal and video control track signal. Appearance of either signal alone indicates an alteration in the tape and its location is stored by computer means. At the end of the inspection, computer means prints out the number, type(s) and location(s) of the alteration(s).

16 Claims, 4 Drawing Figures

APPARATUS AND METHOD FOR INSPECTING MAGNETIC TAPE RECORDED MATERIAL FOR ALTERATIONS

BACKGROUND OF THE INVENTION

This invention relates generally to a method and apparatus for testing audio and video program material recorded on a magnetic recording medium, such as magnetic tape and the like.

More particularly, the present invention is directed to a method and apparatus for high speed, fully automatic detection of erasures and/or over-recordings of audio and video program material recorded on video cassettes.

The recording of program material on VHS or Beta formated video tape cassettes has become widespread in recent years and the rental of prerecorded video cassette programs has been recently introduced on the market.

When prerecorded video tape is used under library or rental conditions, it is desirable to inspect the tape after each use to verify that the original recording has not been altered by erasure, over-recording or if other defects exist in the program material.

Prior art testing and verification of magnetic recording media, such as magnetic tape, for the most part have dealt with the testing and evaluation of the magnetic recording media used in data processing applications. These prior art testing techniques have been directed toward certifying the condition of the magnetic recording medium so that subsequently recorded data will not be lost or that spurious signals such as background noise will not be erroneously read as data.

Typically such prior art techniques as disclosed by U.S. Pat. Nos. 3,755,731 and 3,474,331 involve first recording signals on the medium then reading the recorded data to detect any dropout or non-recording of the data. In addition, the noise characteristics or "background" of the recording medium is tested by subsequently neutralizing or erasing the recorded test data and then sensing the tape for the presence of spurious signals that may be erroneously read as data.

Additionally, prior art has been directed towards preventing the unauthorized duplication of prerecorded program material. U.S. Pat. No. 3,883,892 discloses that, as a protective measure against editing or cutting of the recording medium, a control signal may be recorded at the time the recording is made or at a later time with which it is possible to check the original recording sequence and identify a copy of such a recording in which part(s) of the original information had been modified.

SUMMARY OF THE INVENTION

The tape inspection method and apparatus of the instant invention has a number of novel features over the prior art. Tape inspection by the instant invention is carried out at high speed during rewinding of the tape utilizing a novel signal error detection circuit whereas prior art methods play back the test signals at the same speed at which they were recorded. The test signals sensed are either part of a standard video recording format (control track) or are encoded in the program's audio signal. Prior art methods record test signals independently of program material. Sensing of the test signals is accomplished from the back of the tape which eliminates program wear problems created by the sensing head and tape guides coming in contact with the tape's recording surface in contrast to prior art methods which sense from the front or oxide surface of the top. Tape inspection by the present invention evaluates the characteristics of the recorded program, while the prior art is directed primarily toward evaluating the characteristics of the recording medium.

According to the present invention, automatic, highspeed inspection of magnetic video tape cassettes to determine if the original recording has been altered or if any recording has been added to the tape in a previously unrecorded section is accomplished by simultaneously sensing two test signals prerecorded on the entire length of the tape. A low frequency 20 Hz signal is added to the audio track of the video tape and is part of the total audio signal. A 30 Hz signal is present on the control track of video tapes and is the only signal on that track. The signals are simultaneously sensed by a playback head reading the back or non-oxide side of the video tape, while the tape is being rewound at high speed from end to beginning. Positioning of the playback head to read through the back of the tape avoids any wear problems that might arise from the tape guides or playback head riding the front or oxide surface of the tape. The signals on the audio and control tracks of the video tape are fed from the playback head to a fault detection circuit where they are processed and analyzed to determine tape speed, control track pulse amplitude, audio signal amplitude, the control track pulse pattern, and the low frequency audio signal pattern. This information is compared and analyzed by the fault detection circuit to determine if the original recording has been altered or if new signals have been recorded on a section of the tape that was not used for the original recording. A good tape is indicated by the simultaneous absence or presence of both signals. If either signal appears alone, its location is stored by a microcomputer processing unit which prints out the defect location(s) according to hub turns of the tape.

Therefore, a principal object of this invention is to provide a system for automatic, highspeed inspection of magnetic tape recordings which detects if the original recording has been altered or if any recording has been added to the tape in a previously unrecorded section.

Another object of this invention is to provide a magnetic video tape inspection system which senses both a prerecorded low frequency signal on the tapes audio track and the signal from the tape's control track to detect whether the original recorded program material has been altered or if any recording has been added to the tape in a previously unrecorded section.

Another object of this invention is to provide a magnetic video tape inspection system which senses the video tape's audio track and video control track for defects in the recorded program at high speed during rewinding of the tape, with the sensing means located on the non-oxide side (back) of the tape to prevent excessive wear to damage to the tape's recording surface.

Another object of the invention is to provide a magnetic video tape inspection apparatus for simultaneously inspecting multiple video tapes for alterations in their recorded program material.

Still another object of this invention is to provide a method and apparatus for simultaneously inspecting multiple video tapes for alterations in recorded program material which automatically prints a list of the location(s) of the tape's program defects for each respective tape at the end of the inspection process.

Still another object of this invention is to provide a magnetic video tape inspection apparatus which automatically inspects VHS or Beta formated video cassettes at high speed for detecting alterations in the recorded program material or if any recording has been added to the tape in a previously unrecorded section.

Yet another object of this invention is to provide a method and apparatus for the automatic high speed inspection of magnetic video tapes which detects alterations of the recorded audio and video program material by sensing two signals prerecorded on the entire length of the video tape, one on the audio track, the other on the video control track such that the appearance of either signal alone signals a defect in the video tape program material.

Other objects and features of this invention will be apparent from the following detailed description with respect to the preferred embodiment of the invention when read in conjunction with the accompanying drawings, throughout which like parts are designated by like reference numerals.

DESCRIPTION OF THE PREFERRED EMBODIMENT

Figure 1:
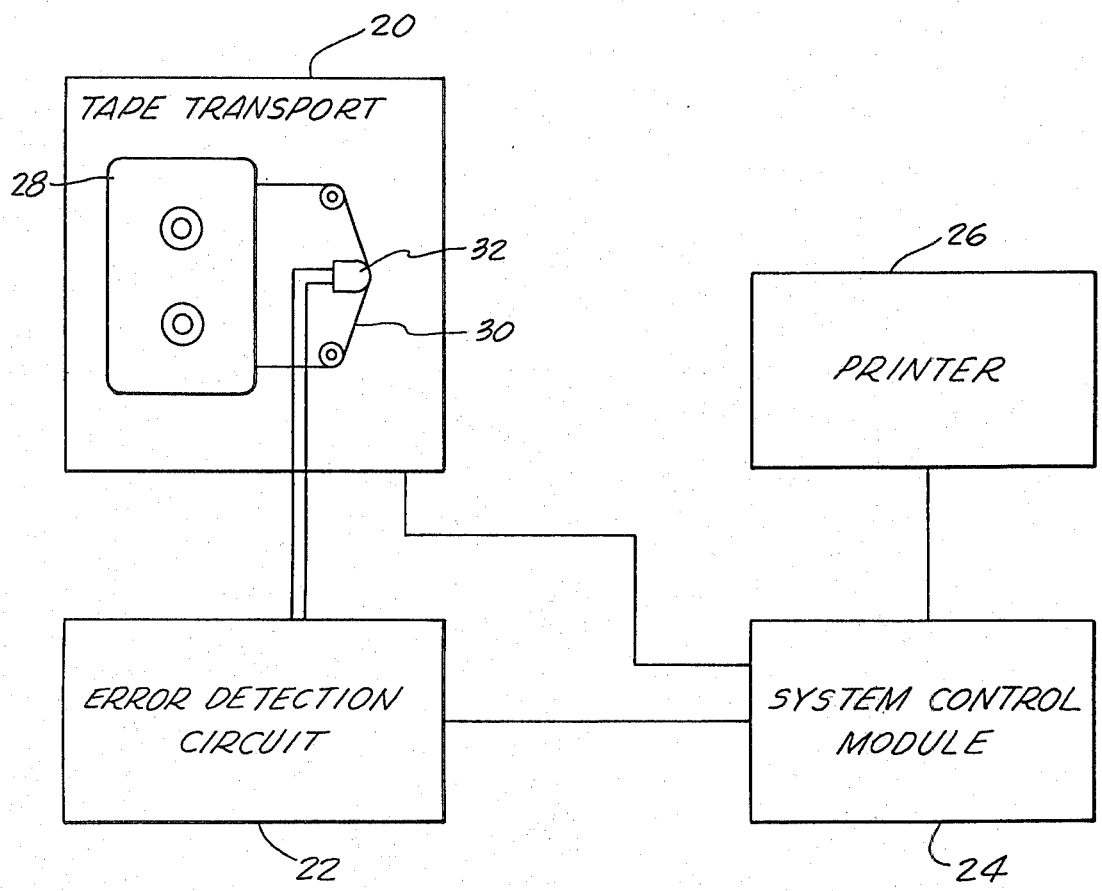
FIG. 1 is a functional block diagram of the preferred embodiment of the invention.

Referring more specifically to the drawings for illustrative purposes, FIG. 1 is a functional block diagram of the invention. The inspection apparatus consists of one or more video tape cassette transports 20 designed to accommodate VHS and/or Beta formated video cassettes, a like number of error detection circuits 22, a system control module microcomputer 24, and a hard copy printer 26.

A video cassette 28 that has been recorded with a low frequency 20 Hz signal added to the tape's program audio track is inserted in the tape transport 20.

The tape's transport 20, under the control of the System Control module drives the video tape 30 forward to its end and then automatically runs the tape 30 in the reverse or rewind direction at a speed of approximately 30 inches per second. As the video tape 30 is withdrawn from the tape cassette 28, it is transported past a read head 32 which is in contact with the back or non-oxide side of the video tape. During the high speed rewinding of the tape the read head 32 receives signals from both the audio track and control track of the video tape. The read head 32 is in contact with the back or non-oxide surface of tape 30. In this position the read head 32 senses the audio and control track signals recorded on the tape's oxide surface through the tape. This enables inspection of the tape to be carried out at high speed, avoiding any wear problems that cause degradation of the recorded program material due to the tape guides or head riding on the recording surface of the tape.

Figure 2:
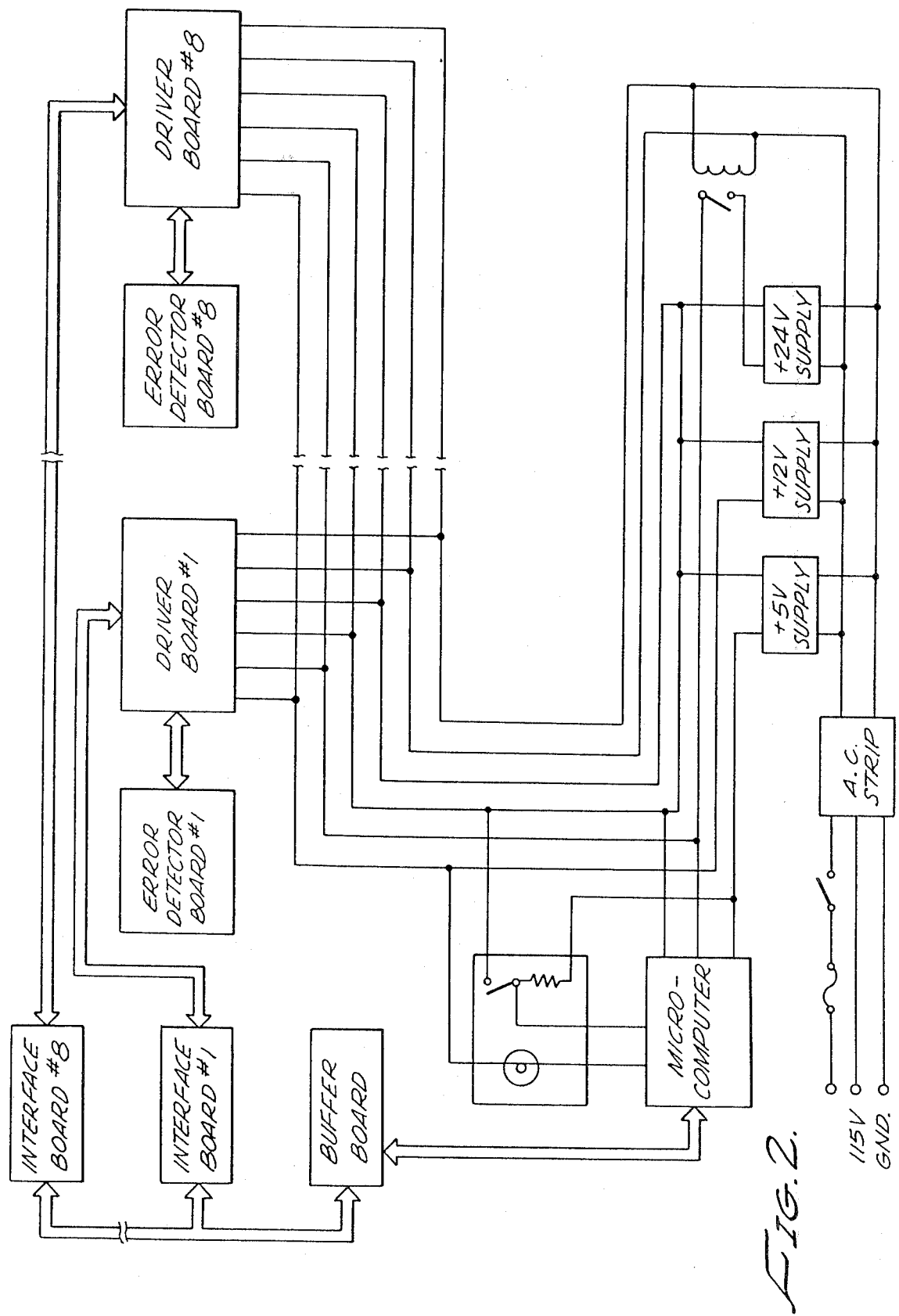
FIG. 2 is a functional block diagram of the circuitry of the preferred embodiment of the invention.

With reference to the block diagram of FIG. 2, the elements are shown symbolically for the sake of simplicity and clarity of the drawing. The circuits represented by these symbols except for the Error Detector Boards are well known in the art and will be described only briefly to review their function.

As shown by FIG. 2, the audio track and control track signals detected by the read head 32 of FIG. 1, are fed through corresponding Interface Boards. The purpose of the Interface Board is to provide input-output means for the microcomputer processor, as well as providing receiver and transmitter means for the input-output signals controlling the tape transport.

The purpose of the Buffer Board is to provide means to increase the drive capability of those signals from the microcomputer, which are used by the Interface Boards and allows the microcomputer to drive multiple Interface Boards and corresponding tape transport decks.

Driver boards corresponding to each Interface Board and tape transport deck provide control means for the tape transport decks and take commands from the microcomputer via the Interface Boards and provide appropriate drive power to the motor's solenoids and lights on the tape transport deck.

Figure 3A:
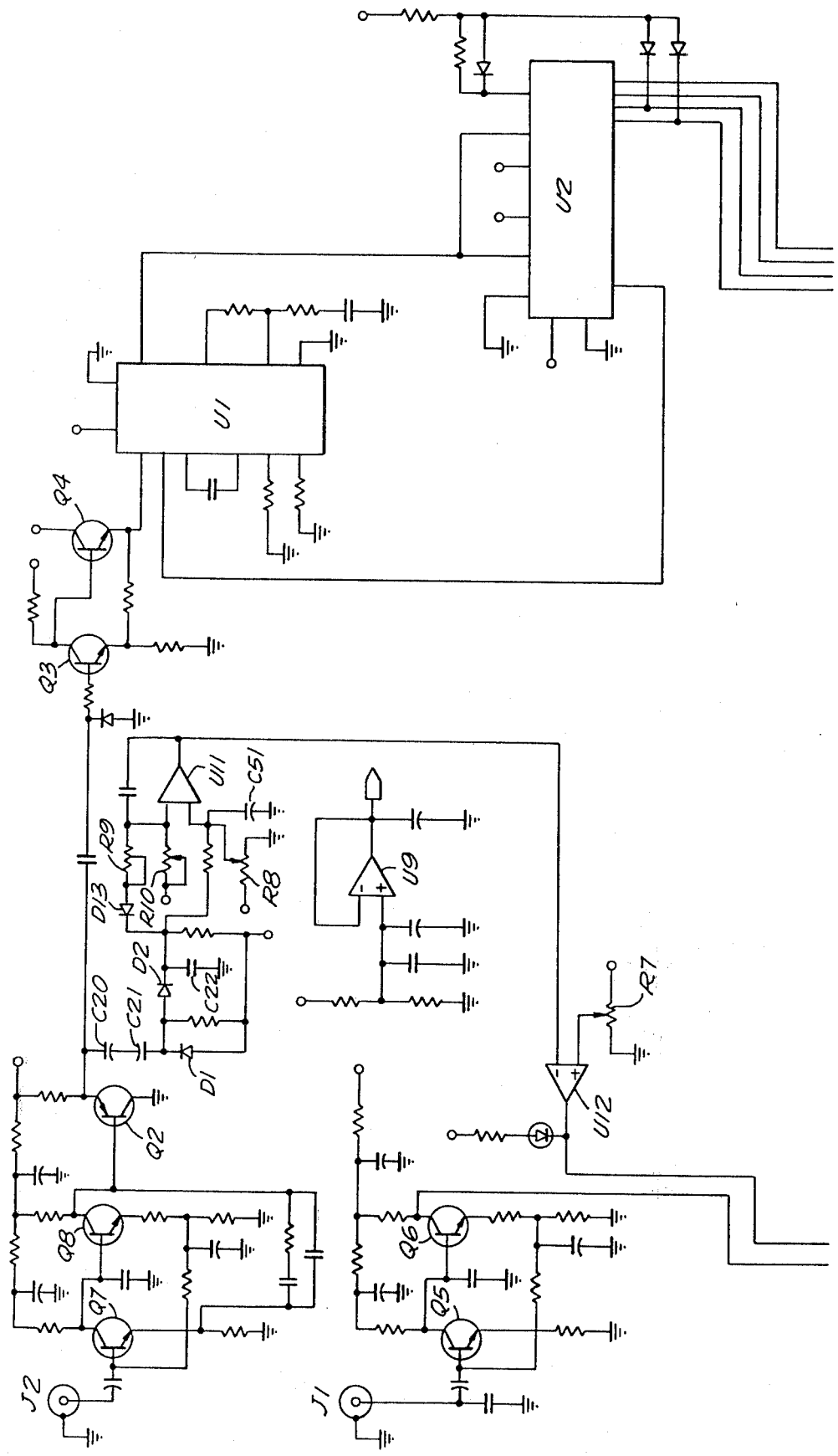
FIGS. 3A and 3B are schematic diagrams of an error detection circuit for processing signals encoded on the video tape.
Figure 3B:
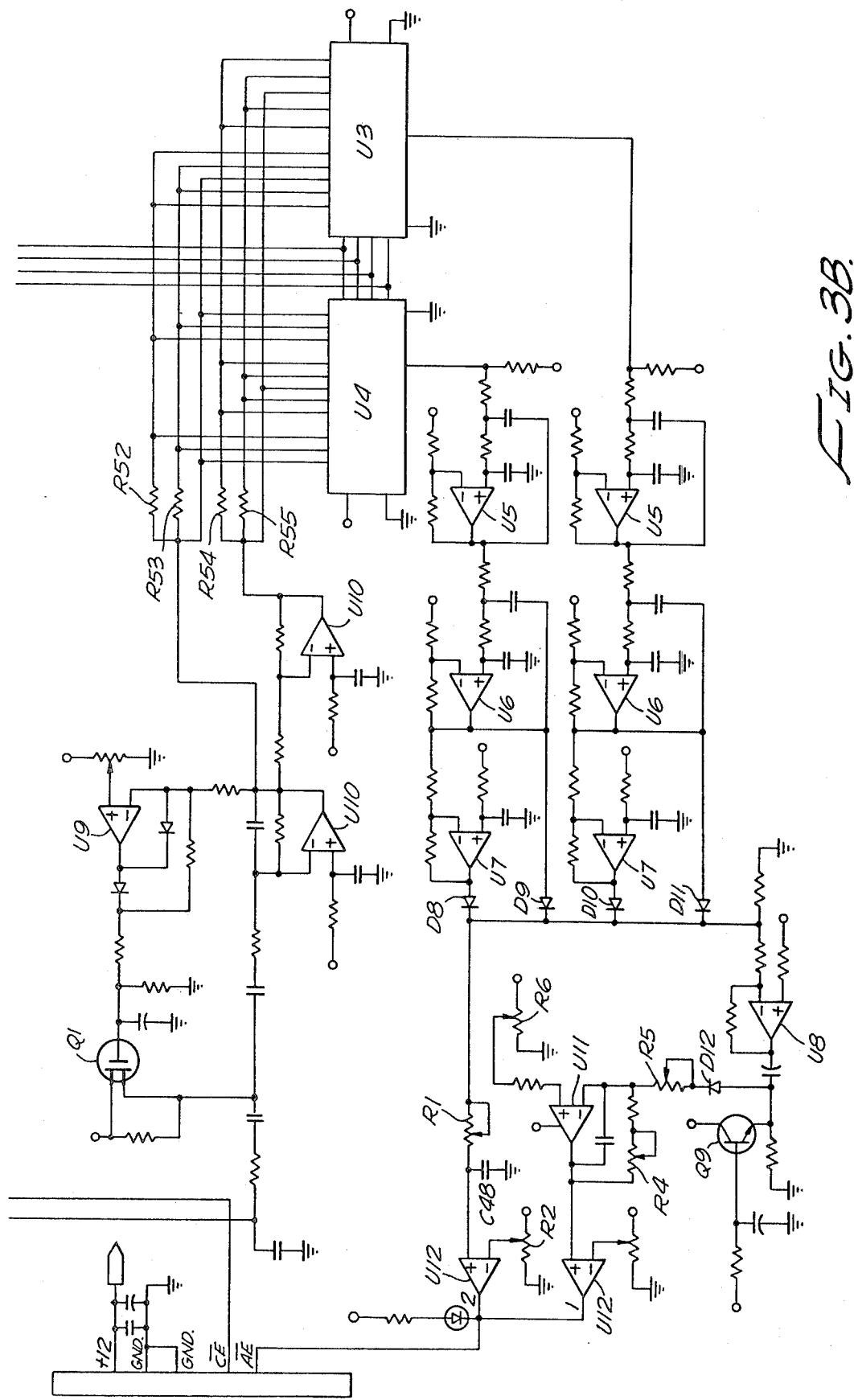

Referring to FIG. 2 and more particularly FIGS. 3A and 3B, error detection circuitry is provided to detect erasures and/or over-recordings of prerecorded video tapes. The error detection circuit as shown in FIGS. 3A and 3B detects erasures and/or over-recordings by processing the two signals picked up by the read head on the tape transport deck. The two signals processed are a 30 Hz signal contained on the video tape control track and a 20 Hz signal which has been added to the program audio on the tape's audio track.

The 30 Hz signal on the tape's control track is easily read and processed as it is the only signal present on that track.

The 20 Hz signal added to the audio track is more difficult to read as it forms part of the total audio signal. Additionally as the tape is being rewound during the inspection process, it moves 10 to 40 times normal play speed causing the 30 Hz control track and the 20 Hz audio track signal to vary in frequency from 300 to 1200 Hz and 200 Hz to 800 Hz respectively.

At any given time during the rewinding of the tape the frequency of the encoded signal on the audio track will be two thirds the frequency of the control track signal.

To detect the 20 Hz signal, a digital sine wave of two thirds the control track frequency is mixed with the audio track signal and the output is low pass filtered. As the only signal on the audio track that can be the same frequency as the digital sine wave, or close to it, is the 20 Hz signal, a very low beat frequency (the difference of the two signals) will result from the mixing and pass through the filter. Any loss of this beat frequency is detected as a loss of the 20 Hz signal indicating an erasure or over-recording of the tape and is transmitted to the microcomputer where it is stored. At the end of the inspection run the microcomputer prints a list of such errors and their location by hub turns of the tape.

Referring to FIGS. 3A and 3B, the control track signal, as detected by the tape read head 32 during high speed inspection, is fed through cable J2 amplified by transistors Q7 and Q8. Transistor Q2 is an emitter follower to provide a low impedance drive. A voltage doubler (diode D1, capacitors C20 and C21) is used to give a bigger signal so the diode drop from D2 and D13 is negligible. Integrated circuit U11's output integrates positive whenever the detected signal on capacitor C22 falls below the threshold voltage on capacitor C51.

Resistor R8 adjusts the threshold for depth of a detected signal dropout. Resistor R9 adjusts the length of a detected signal dropout. Resistor R10 adjusts the time for the integrator U11. Comparator U12 converts integrator's U11 output to a low-going error pulse, the threshold of which is set by resistor R7. The control track error pulse is then fed through connector CE to the microcomputer where it is stored as a fault or error representing an erasure or over-recording of the video control track.

Again referring to FIGS. 3A and 3B, the tape read head 32 output is fed from the tape read head through cable J1 where transistors Q5 and Q6, integrated circuits U9 and U10 and transistor Q1 (FIG. 3B) of the error detection circuit amplify and provide automatic gain control for the incoming audio track signal. Additionally, the signal is inverted and both phases are fed to integrated circuits U3 and U4.

Integrated circuit U1 (FIG. 3A) is a phase locked loop (P.L.L.) connected as a frequency multiplier. Transistors Q3 and Q4 square up the control track signal and drive one input of the P.L.L. The other input is the P.L.L.'s output divided by eight by integrated circuit U2 to keep both inputs of the P.L.L. at the same frequency, the P.L.L.'s output runs at eight times the control track frequency. The other half of integrated circuit U2 counts the P.L.L.'s output and resets itself after every twelfth count. Thus, twelve sequential counts from zero to eleven are obtained which select the different inputs of integrated circuits U3 and U4.

Different gains for the P.L.L. inputs are provided by different value resistors (R52, R53, R54 and R55). The twelve selections at different gains, provides one cycle of sinusoidally varying steps that get "multiplied" by the value of the audio signal. The frequency of this stepped sine wave is one-twelfth of eight times the control track frequency, or two thirds the control track frequency. By "multiplying" both phases (0° and 180°) of the audio track signal, integrated circuit U3 acts as a balanced modulator. Similarly, by shifting the signal inputs three positions (i.e. 90°) to integrated circuit U4, it acts as a balanced modulator whose output is 90 degrees from U3's output.

The "multiplying" of the two signals, the stepped sine wave derived from the 30 Hz control track and the 20 Hz signal encoded on the audio track, gives rise to a beat frequency which is the difference frequency between the two signals. As the 20 Hz signal on the audio track and the stepped sine wave derived from the control track are very close in frequency, a very low frequency beat is obtained. Integrated circuits U5 and U6 form a fourth order low pass Butterworth filter which passes the beat frequency, but atenuates anything above it.

Integrated circuits U7 act as inverters to provide two more phases (90° and 270°). Diodes D8 and D9 full wave rectify phase 90° and 270°. Diodes D10 and D11 full wave rectify phase 0° and 180°. The result is a "detected" 20 Hz signal (a DC signal with some ripple on it) that corresponds to the amplitude of the 20 Hz signal on the audio track. Gradual long term amplitude changes in the signal are detected by resistor R1, capacitor C48 and integrated circuit U12. Resistor R2 adjusts the amplitude threshold. Integrated circuit U8 inverts the detected 20 Hz signal and transistor Q9 clamps it to six volts.

Any short term dropouts in the 20 Hz audio signal will appear as positive going pulses at diode D12's anode.

Integrated circuit U11 integrates negative for any signal pulses above the threshold set by resistor R6. Resistor R5 sets the length of a detected pulse and resistor R4 adjusts the reset time of the integrator U11.

Integrated circuit U12 (FIG. 3B) acts as a comparator to convert the integrator's U11 output to a low going error pulse. Both audio error comparators are wired, so that either the short term error (integrated circuit U12, pin 1) or the long term error (integrated circuit U12 pin 2) will cause the audio error line to go low, signaling an erasure or over-recording on the audio track of the video tape. The audio track error pulse is then fed to the microcomputer via connector AE where it is stored until the end of the inspection process is complete, i.e., the tape is fully rewound, and a list indicating the type of error control track and its location according to the hub turns of the tape transport is printed.

The word "error" as used herein is considered to refer to a signal which has been changed by an alteration of the magnetic tape recording.

While the invention has been particularly shown and described with reference to a preferred embodiment thereof it will be understood by those skilled in the art that the foregoing and other changes in form and details may be made therein without departing from the spirit and scope of the invention.

I claim:

1. Apparatus for inspecting the program material recorded on magnetic tape comprising:
   a. sensing means for simultaneously detecting a plurality of recording tracks on said tape one of which contains a prerecorded fixed frequency signal added to the program material recorded on that track;
   b. means for transporting said tape past said sensing means;
   c. circuit means for processing signals detected by said sensing means so that the detection of a signal on a single track alone registers as an error in said tape's recorded program material;
   d. means for printing the type and location of errors detected on the tape; and
   e. computer processor means for automatically controlling the operation of said tape inspection apparatus.

2. The apparatus as described in claim 1 wherein said sensing means is in contact with the back non-recording side of said tape so that signals recorded on the front of said tape are sensed through said tape.

3. The apparatus as described in claim 1 wherein said transport means accommodates video tape cassettes.

4. The apparatus as described in claim 1 wherein said circuit means includes means for isolating an encoded fixed frequency signal on an audio track of said tape from the program audio contained on said audio track so that absence of said encoded signal alone indicates an erasure or over-recording of said tape.

5. The apparatus as described in claim 1 wherein said circuit means includes means for processing a fixed frequency signal contained on a control track of said tape so that absence of said signal alone indicates an erasure or over-recording of said tape.

6. Apparatus for inspecting the program material recorded on magnetic tapes comprising:

a. sensing means for simultaneously detecting a tape's video control track signal and an encoded signal added to a tape's audio track during recording of the program material;

b. transport means for moving said tape past said sensing means;

c. circuit means for processing signals detected by said sensing means so that the detection of either said tape's control track signal or the added audio track signal alone registers as an error in said tape's recorded program material;

d. printing means for printing the type and location of errors detected on the tape;

e. computer processor means for automatically controlling the operation of said tape inspection apparatus during the inspection of the type's recorded program material so that the tape is advanced to its end then rewound at high speed and sensed for erasures and/or over-recording on said tape's control track and audio track.

7. The apparatus as described in claim 6 in which said circuit means for detection of said encoded signal on said tape's audio track includes:

a. means for generating a digital sine wave of a frequency substantially the same as the frequency of the encoded signal;

b. means for mixing said sine wave and said encoded audio track signal;

c. means for low pass filtering the mixed signals;

d. means for detecting a beat frequency resulting from mixing and filtering of said signals; and e. means for generating an error signal upon detection of any loss of said beat frequency so as to indicate an erasure and/or over-recording of the audio program.

8. Apparatus for inspecting the program material recorded on magnetic video tapes comprising:

a. sensing means in contact with a non-recording surface of said tape for simultaneously detecting said tape's video control track signal and a signal encoded on said tape's audio track during recording of the program material;

b. transport means for moving said tape past said sensing means at high speed during rewinding of said tape;

c. circuit means for processing said tape's control track and audio track signals to detect erasures and/or over-recordings on said track of said tape, including means for generating a digital sine wave of a frequency substantially the same as the frequency of the encoded audio track signal, means for mixing said sine wave and said encoded audio track signal, means for low pass filtering said mixed signals, means for detecting a beat frequency resulting from mixing and filtering of said signals, and means for generating an error signal upon detection of any loss of said beat frequency so as to indicate an erasure or over-recording of said tape's audio program.

9. The method of inspecting a magnetic video recorded tape for erasures or over-recording of the recorded program material comprising the steps of:

a. moving tape past sensing means for detecting signals contained on said tape;

b. sensing the absence or presence of test signals prerecorded on separate tracks of said tape;

c. processing said test signals so that the simultaneous presence of recorded signals from separate tracks of the tape indicates an error free tape and the absence of a test signal from at least one of said tracks indicates an erasure or over-recording of said tape's program material;

d. upon detection of an erasure or over-recording error, storing said error in computer processor means; and e. after completion of tape inspection, said computer processor prints a list of errors and their locations according to the number hub turns of the tape.

10. The method as described in claim 9 in which sensing of said tape is accomplished by a sensing means in contact with the back non-recording side of said tape.

11. The method as described in claim 9 in which said tape is moved past sensing means at a speed greater than the speed at which program material contained on said tape was recorded.

12. The method as described in claim 9 in which said tape is magnetic video tape.

13. The method as described in claim 12 in which a signal of fixed frequency contained on a video control track and a fixed frequency signal encoded onto an audio track are sensed to detect any erasures or over-recording of said tape's recorded program.

14. The method as described in claim 13 in which said audio track signal frequency encoded on said tape's audio track is two thirds the control track frequency.

15. The method as described in claim 14 in which said encoded signal on said tape's audio track is detected by generating a digital sine wave of two thirds said tape's control track frequency, mixing said sine wave with said audio track signal, low pass filtering the output of said signal, detecting a beat frequency as the result from the mixing and low pass filtering of the two signals, and detecting any loss of beat frequency as a loss of said encoded audio track signal indicating an erasure or over-recording of said tape.

16. The method of inspecting magnetic video tape for erasures or over-recordings of the tape's recorded program material comprising the steps of:

a. moving tape past sensing means for detecting signals contained on said tape at a speed greater than the speed at which program material contained on said tape was recorded;

b. sensing the absence or presence of test signals prerecorded on said tape's audio track and video control track by sensing means in contact with the back, non-recording side of said tape;

c. processing said control track test signal and said audio track test signal so that the simultaneous presence of said signals indicates an error free tape and appearance of one test signal alone indicates an erasure or over-recording of said tape's program material;

d. upon detection an erasure or over-recording error storing said error in microcomputer processor means;

e. after completion of tape inspection said microcomputer processor prints a list of errors and their location according to hub turns of said tape.

* * * * *